US012015903B2

(12) United States Patent
Chen et al.

(10) Patent No.: US 12,015,903 B2
(45) Date of Patent: Jun. 18, 2024

(54) HEADPHONE AND HEADPHONE STATUS DETECTION METHOD

(71) Applicant: LUXSHARE-ICT CO., LTD., Taipei (TW)

(72) Inventors: Hsin-Nan Chen, Taipei (TW); Tsung-Pao Hsu, Taipei (TW); Jung-Pin Chien, Taipei (TW); Yao-Chun Tsai, Taipei (TW); You-Yu Lin, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 0 days.

(21) Appl. No.: 17/829,725

(22) Filed: Jun. 1, 2022

(65) Prior Publication Data

US 2022/0295183 A1 Sep. 15, 2022

(30) Foreign Application Priority Data

Jun. 15, 2021 (TW) ................................ 110121772

(51) Int. Cl.
*H04R 3/08* (2006.01)

(52) U.S. Cl.
CPC ..................................... *H04R 3/08* (2013.01)

(58) Field of Classification Search
CPC ...... H04R 1/1041; H04R 1/1091; H04R 3/08; H04R 5/033; H04R 2460/01; H04R 2460/03
USPC ........................................................... 381/74
See application file for complete search history.

(56) References Cited

U.S. PATENT DOCUMENTS

2021/0014600 A1* 1/2021 Neumaier ........... G01S 15/8906

FOREIGN PATENT DOCUMENTS

| | | | |
|---|---|---|---|
| CN | 111800687 | A | 10/2020 |
| CN | 111988690 | A | 11/2020 |
| JP | S57-171582 | U | 10/1982 |
| JP | H11-328585 | A | 11/1999 |
| JP | 2012-156090 | A | 8/2012 |
| JP | 2015-022268 | A | 2/2015 |
| WO | WO 2020-129196 | A1 | 6/2020 |

* cited by examiner

*Primary Examiner* — Paul Kim
(74) *Attorney, Agent, or Firm* — Birch, Stewart, Kolasch & Birch, LLP

(57) ABSTRACT

A headphone and a headphone status detection method are provided. A signal processor of the headphone transmits a plurality of code messages to a first audio playback unit, so that the first audio playback unit plays a plurality of first audio signals with different frequencies corresponding to the code messages according to a playback sequence. The signal processor obtains a plurality of first time points at which a first audio receiving unit receives the first audio signals that are reflected for the first time. The signal processor determines a wear status of the headphone according to the plurality of first time points.

18 Claims, 6 Drawing Sheets

HEADPHONE AND HEADPHONE STATUS DETECTION METHOD

CROSS-REFERENCE TO RELATED APPLICATION

This non-provisional application claims priority under 35 U.S.C. § 119(a) to Patent Application No. 110121772 filed in Taiwan, R.O.C. on Jun. 15, 2021, the entire contents of which are hereby incorporated by reference.

BACKGROUND

Technical Field

The present invention relates to headphone technologies, and in particular, to a headphone and a headphone status detection method related to the detection of a wear status of the headphone.

Related Art

The noise source of headphone products may be divided into two types. One is electrical noise caused by internal circuits or external signals, and manufacturers can effectively suppress and cancel the electrical noise through circuit design. The other type of noise is the so-called audio noise (environmental noise), which affects the comfort of listening to music using a headphone. In order to alleviate the environmental noise, an active noise cancelation (ANC) method is generally adopted. A conventional digital ANC system samples noise in the surrounding environment through a detection microphone, performs signal processing to generate signals for canceling the environmental noise, and transmits audio signals having phases opposite to the phase of the noise through a speaker, to counteract the noise in the external environment.

Generally, the ANC system continuously monitors the sound reaching the ears through a detection microphone located in a headphone shell. An output signal of the detection microphone is amplified, digitized by an analog-to-digital converter, and then sent to a digital noise cancellation processor (DNC processor). A signal from a music source is digitized by the analog-to-digital converter and then processed by a digital equalizer to obtain appropriate frequency characteristics. Then, the signal enters the DNC processor, and the DNC processor subtracts environmental noise from the music source signal and extracts to-be-canceled noise. The extracted to-be-canceled noise undergoes phase inversion, and the processed signal results are replayed together with the music signal through a driver, so that the noise is canceled before entering the ears.

Generally, headphones with an ANC system require a battery or another power source to operate. In this case, there is a common problem that if a user removes the headphone without turning the headphone off, the headphone continues to consume power until the battery runs down. Therefore, currently, some headphones can detect whether the user is wearing the headphone, and the conventional designs rely on mechanical sensors such as touch sensors or magnets to determine whether the headphone is being worn by the user.

SUMMARY

Although some existing headphones are equipped with sensors to detect whether the user is wearing the headphone, the sensors are not part of the headphones. Instead, the sensors are usually additional components, which may increase the cost or complexity of the headphone. In view of this, the present invention provides a headphone and a headphone status detection method, to alleviate the existing technical problem.

The present invention provides a headphone. The headphone includes a signal processor, a first audio playback unit, and a first audio receiving unit. The signal processor is configured to sequentially transmit a plurality of code messages, where any two code messages that are successively transmitted among the plurality of code messages correspond to different frequencies. The first audio playback unit receives a plurality of code messages transmitted by the signal processor, and plays a plurality of first audio signals corresponding to the code messages according to a playback sequence. The signal processor obtains a plurality of first time points at which the first audio receiving unit receives the plurality of first audio signals that are reflected for the first time. The signal processor further determines a wear status of the headphone according to the plurality of first time points.

The present invention provides a headphone status detection method, performed by a signal processor of a headphone. The headphone status detection method includes the following steps: transmitting a plurality of code messages to a first audio playback unit, so that the first audio playback unit plays a plurality of first audio signals corresponding to the code messages according to a playback sequence, where any two code messages that are successively transmitted among the code messages correspond to different frequencies; acquiring a plurality of first time points at which a first audio receiving unit receives the first audio signals that are reflected for the first time; and determining a wear status of the headphone according to the first time points.

Based on the above, the present invention provides a headphone and a headphone status detection method. The first audio playback unit receives a plurality of code messages transmitted by the signal processor, and plays a plurality of first audio signals corresponding to the plurality of code messages according to a playback sequence. Any two audio signals with a same frequency among the first audio signals are spaced by at least a first quantity of audio signals with frequencies different from each other. The signal processor obtains a plurality of first time points at which the first audio receiving unit receives the plurality of first audio signals that are reflected for the first time. The signal processor further determines a wear status of the headphone according to the plurality of first time points. Accordingly, in the headphone, the headphone status detection method, a computer-readable recording medium with a stored program, and a non-transitory computer program product according to the present invention, an existing speaker in a headphone can be used as the first audio playback unit and a microphone with an ANC system can be used as the first audio receiving unit. Therefore, no additional components are required, and the cost or complexity of the headphone is not increased.

DETAILED DESCRIPTION

Figure 1:
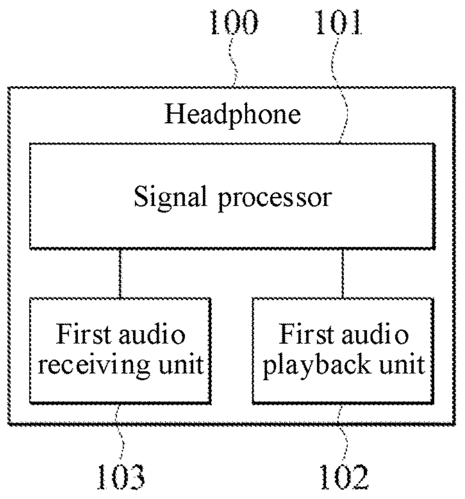
FIG. 1 is a system block diagram of a headphone drawn according to an embodiment of the present invention.

The foregoing and other technical contents, features, and effects of the present invention can be clearly presented below in detailed description with reference to embodiments of the accompanying drawings. Thicknesses or sizes of the elements in the drawings expressed in an exaggerated, omitted or general manner are used to help a person skilled in the art to understand and read, and the size of each element is not a completely actual size and is not intended to limit restraint conditions under which the present invention can be implemented and therefore have no technical significance. Any modification to the structure, change to the proportional relationship or adjustment on the size should fall within the scope of the technical content disclosed by the present invention without affecting the effects and the objectives that can be achieved by the present invention. The same reference numerals are used to indicate the same or similar elements in all of the drawings. The term “coupled” or “connect” provided in the following embodiments may refer to any direct or indirect connection means.

FIG. 1 is a system block diagram of a headphone drawn according to an embodiment of the present invention. Referring to FIG. 1, the headphone 100 includes a signal processor 101, a first audio playback unit 102, and a first audio receiving unit 103. In this embodiment, the first audio playback unit 102 may be an existing speaker of the headphone, and the first audio receiving unit 103 may be an existing feedback microphone with an ANC system of the headphone.

Generally, the first audio playback unit 102 plays a headphone audio signal. The headphone audio signal may be generated by an audio source during the audio playback of various devices. The devices may be, for example, a media player, a computer, a radio, a mobile phone, a CD player, or a game console. For example, a user connects the headphone 100 to a portable media player that plays songs selected by the user, so as to receive the headphone audio signal (for example, a song being played by the portable media player), and the first audio playback unit 102 outputs an acoustic signal of the headphone audio signal. The first audio receiving unit 103 samples the acoustic signal outputted by the first audio playback unit 102 and an acoustic signal of the environment at the first audio playback unit 102.

The signal processor 101 receives external commands, and edits and stores audios with different frequencies as codes according to time codes 1, 2, 3 . . . and M. As shown in Table (1), M is a positive integer.

TABLE (1)

| Audio | 45 kHz | 55 kHz | 65 kHz | 75 kHz | 85 kHz | 95 kHz |
|---|---|---|---|---|---|---|
| Time code 1 | 1A | 1B | 1C | 1D | 1E | 1F |
| Time code 2 | 2A | 2B | 2C | 2D | 2E | 2F |
| . | . | . | . | . | . | . |
| . | . | . | . | . | . | . |
| . | . | . | . | . | . | . |
| Time code 10 | 10A | 10B | 10C | 10D | 10E | 10F |

Audio frequencies corresponding to a same time code are different from each other, and audio frequencies that are successively transmitted are different. For example, in Table (1), for the codes 1A, 1B . . . 1F corresponding to the time code 1, the corresponding audio frequencies are different from each other; and any two code messages that are successively transmitted correspond to different audio frequencies. For example, frequencies corresponding to the code 1A and the code 1B that are successively transmitted are respectively 45 kHz and 55 kHz, and frequencies corresponding to the code 1F and the code 2A that are successively transmitted are respectively 95 kHz and 45 kHz.

In this embodiment, the signal processor 101 receives external commands, and edits and stores audios with frequencies of 45 kHz, 55 kHz, 65 kHz, 75 kHz, 85 kHz, and 95 kHz as the codes 1A, 1B . . . and 10F according to the time codes 1, 2, 3 . . . and 10. In some embodiments, frequencies corresponding to the codes 1A, 1B . . . 1F may vary according to requirements and actual situations (for example, an applicable frequency range of the first audio playback unit 102). For example, the frequencies corresponding to the codes 1A, 1B . . . and 1F may be respectively 5 kHz, 10 kHz, 15 kHz, 25 kHz, 35 kHz, and 45 kHz.

In some embodiments, the signal processor 101 generates and transmits code messages of the codes 1A, 1B . . . and 10F according to a preset rule. For example, according to a preset rule, the signal processor 101 generates and transmits code messages of the codes 1A, 1B . . . and 1F in a period corresponding to the time code 1, generates and transmits code messages of the codes 2A, 2B . . . and 2F in a period corresponding to the time code 2, and so on. In some embodiments, after transmitting the codes 1A, 1B . . . and 10F (for example, after transmitting the code 10F), the signal processor 101 re-starts to transmit the codes 1A, 1B . . . and 10F. In some embodiments, after transmitting the codes 1A, 1B . . . and 10F (for example, after transmitting the code 10F), the signal processor 101 pauses for a predetermined time and then re-starts to transmit the codes 1A, 1B . . . and 10F.

In some embodiments, content of the code 1A to the code 1F is respectively the same as that of the code 2A to the code 2F. For example, the code 1A and the code 2A are a same code message of 45 kHz, the code 1B and the code 2B are a same code message of 55 kHz, and the code 1F and the code 2F are a same code message of 95 kHz. By analogy, the content of the code 1A to the code 1F is respectively the same as that of the code 10A to the code 10F. That is, code messages of a same frequency of different time codes are the same. In some embodiments, content of the code 1A to the code 1F is respectively different from that of the code 2A to the code 2F. For example, both the code 1A and the code 2A are of 45 kHz but code messages of the two are different, both the code 1B and the code 2B are of 55 kHz but code messages of the two are different, and both the code 1F and the code 2F are of 95 kHz but code messages of the two are different. By analogy, the content of the code 1A to the code 1F is respectively different from that of the code 10A to the code 10F. That is, code messages of a same frequency of different time codes are different.

Figure 2:
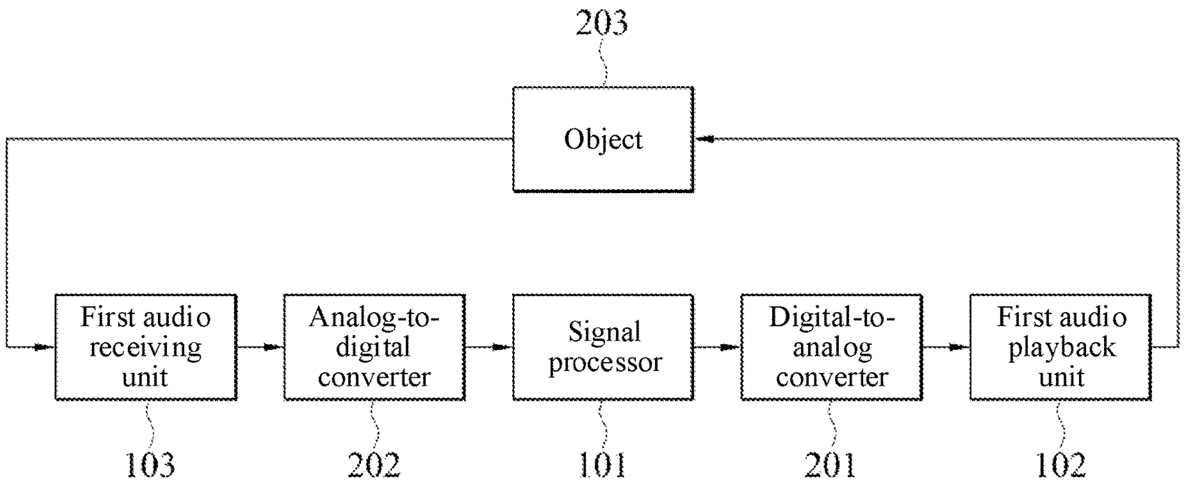
FIG. 2 is a schematic operation flowchart of the headphone drawn according to an embodiment of the present invention.
Figure 3:
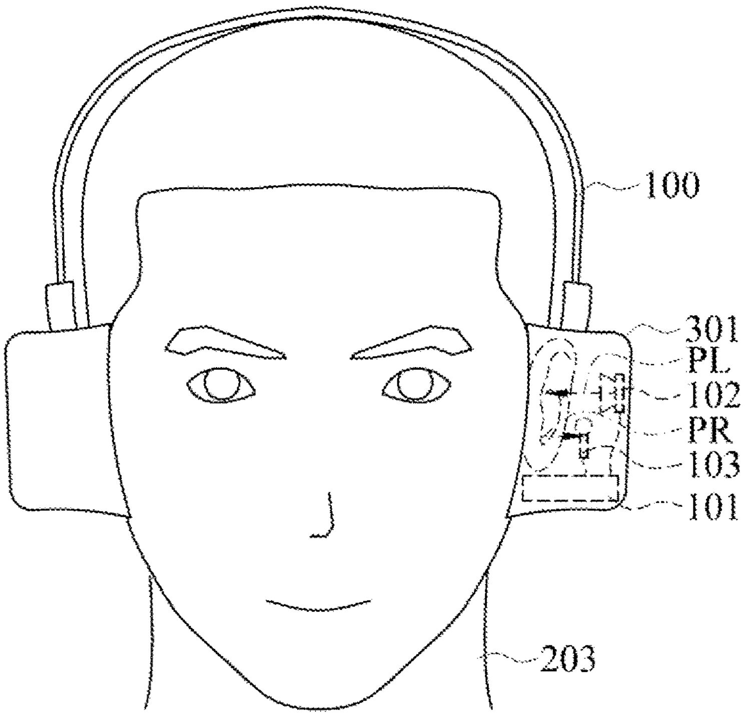
FIG. 3 is a schematic operation diagram of the headphone drawn according to an embodiment of the present invention.

FIG. 2 is a schematic operation flowchart of the headphone drawn according to an embodiment of the present invention. FIG. 3 is a schematic operation diagram of the headphone drawn according to an embodiment of the present invention. Referring to FIG. 2 and FIG. 3 together, the signal processor 101, the first audio playback unit 102, and the first audio receiving unit 103 are disposed inside a headphone shell 301. It should be noted that, FIG. 2 and FIG. 3 show the signal processor 101 as being disposed in the headphone shell 301 of the left ear, but in other embodiments, the signal processor 101 may exist in the headphone shell of the left ear, right ear, or both ears.

The signal processor 101 transmits code messages according to the codes 1A, 1B . . . and 10F. The code messages are converted into an analog form via a digital-to-analog converter 201, and then transmitted to the first audio playback unit 102. The first audio playback unit 102 injects a corresponding audio signal into the headphone audio signal according to the received code messages. For example, when the signal processor 101 transmits code messages corresponding to the code 2A to the first audio playback unit 102, the first audio playback unit 102 injects an audio signal of 45 kHz into the headphone audio signal after receiving the code messages corresponding to the code 2A.

An audio signal (for example, the audio signal of 45 kHz) propagates via a path PL and is reflected via a path PR after encountering an object 203. When sampling an acoustic signal of the environment, the first audio receiving unit 103 transmits the sampled acoustic signal to the signal processor 101 via an analog-to-digital converter 202. The signal processor 101 detects a reflected audio signal from the acoustic signal of the environment sampled by the first audio receiving unit 103, and obtains a time point at which the first audio receiving unit 103 receives the reflected audio signal.

The signal processor 101 can obtain a time difference by comparing a time point at which the first audio playback unit 102 transmits the audio signal and a time point at which the signal processor 101 detects the reflected audio signal. Using an equation: distance=sound speed×time difference, the signal processor 101 can obtain the sum of a distance between the first audio playback unit 102 and the object 203 and a distance between the object 203 and the first audio receiving unit 103. Since the first audio playback unit 102 and the first audio receiving unit 103 are disposed at fixed positions of the headphone, the signal processor 101 can obtain a distance between the headphone 100 and the object 203. For example, the first audio playback unit 102 and the first audio receiving unit 103 are disposed in appropriate positions, so that a predetermined distance between the first audio playback unit 102 and the object 203 is the same as a predetermined distance between the first audio receiving unit 103 and the object 203. In this case, the distance between the first audio playback unit 102 and the object 203 is equal to sound speed×time difference/2. In addition, the distance between the headphone 100 and the object 203 may be set as the distance between the first audio playback unit 102 and the object 203.

A headphone status detection method and cooperation between hardware of the headphone 100 according to the embodiments of the present invention are described in detail below with reference to the drawings.

Figure 7:
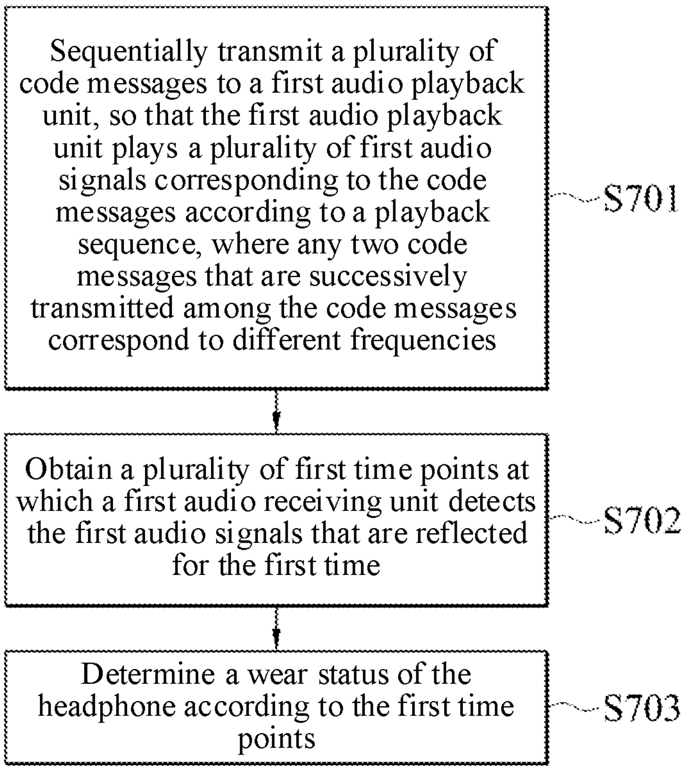
FIG. 7 is a flowchart of a headphone status detection method drawn according to an embodiment of the present invention.

FIG. 7 is a flowchart of a headphone status detection method drawn according to an embodiment of the present invention. Refer to FIG. 1, FIG. 2, FIG. 3, and FIG. 7 together. In step S701, the signal processor 101 sequentially transmits the code messages to the first audio playback unit 102 according to a playback sequence of 1A, 1B . . . and 1F at a first predetermined interval. For example, after transmitting the code 1A, the signal processor 101 waits for the first predetermined interval to transmit the code 1B, and then waits for the first predetermined interval to transmit the code 1C. The code messages are transmitted in this sequence until the code 1F is transmitted. In this embodiment, the first predetermined interval is 1 second. The first audio playback unit 102 injects a corresponding audio signal into the headphone audio signal according to the received code messages, to play a plurality of first audio signals corresponding to the code messages. After a second predetermined interval, the signal processor 101 sequentially transmits the code messages to the first audio playback unit 102 according to a playback sequence of 2A, 2B . . . and 2F at the first predetermined interval. In this embodiment, the second predetermined interval is 1 second. The signal processor 101 repeats the above process until the code messages corresponding to all codes are transmitted to the first audio playback unit 102. In some embodiments, the second predetermined interval is the time required for the signal processor 101 to sequentially transmit the code 1A to the code 1F at the first predetermined interval.

In step S702, the first audio receiving unit 103 transmits the sampled acoustic signal to the signal processor 101 via the analog-to-digital converter 202. The signal processor 101 detects reflected audio signals in the acoustic signal of the environment through the first audio receiving unit 103, and obtains a plurality of first time points at which the first audio receiving unit 103 receives the reflected audio signals corresponding to the code 1A to the code 10F.

In this embodiment, after the signal processor 101 transmits a code message (for example, 2A), if the signal processor 101 does not detect the corresponding reflected audio signal (in this example, the audio signal of 45 kHz) after the second predetermined time, the signal processor 101 uses a time point obtained by adding the second predetermined time to a time point at which the code message is transmitted as the first time point at which the reflected audio signal corresponding to the code 2A is received.

In step S703, the signal processor 101 determines a wear status of the headphone 100 according to the first time points. In this embodiment, by corresponding to different time codes, audio signals with a same frequency (for example, audio signals corresponding to the codes 1A and 2A) are played via the first audio playback unit 102 after a sufficiently long interval. Therefore, the signal processor 101 is not likely to be confused with the audio signals corresponding to the codes 1A and 2A even though the frequencies of the audio signals are the same.

In some embodiments, in response to time intervals of the first time points being the same, the signal processor 101 determines that the wear status of the headphone 100 is a normal wear status.

Figure 8:
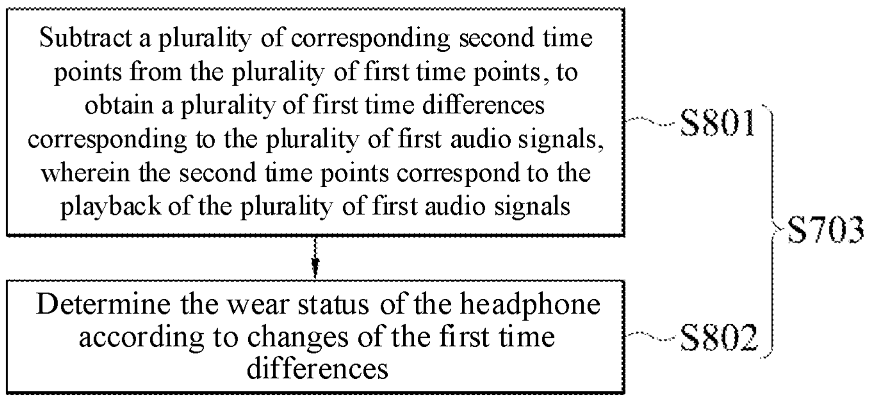
FIG. 8 is a flowchart of the headphone status detection method drawn according to an embodiment of the present invention.

FIG. 8 is a flowchart of the headphone status detection method drawn according to an embodiment of the present invention. Referring to FIG. 8, in some embodiments, the foregoing step S703 further includes steps S801 and S802. In step S801, when transmitting code messages corresponding to the codes 1A, 1B . . . and 10F, the signal processor 101 stores a plurality of second time points at which the code messages are transmitted, and then respectively subtracts the second time points corresponding to the same codes from the first time points, to obtain a plurality of first time differences.

In step S802, the signal processor 101 further determines the wear status of the headphone 100 according to changes of the first time differences.

If the first time differences are all less than a first predetermined time that is preset, it indicates that the headphone 100 is stably maintained within a preset distance from the object 203, and it can be determined that the headphone 100 is in a normal wear status. Therefore, in some embodiments, in response to the first time differences all being less than the first predetermined time that is preset, the signal processor 101 determines that the wear status of the headphone 100 is a normal wear status. In this embodiment, the first predetermined time is 90 μs. It should be noted that, the first predetermined time is set according to actual positions at which the first audio playback unit 102 and the first audio receiving unit 103 are disposed in the headphone 100, and the present invention is not limited to this.

In some embodiments, in response to the first time differences all being less than the first predetermined time that is preset and each difference between the first time differences being less than an error value, the signal processor 101 determines that the wear status of the headphone 100 is a normal wear status. In this embodiment, the first predetermined time is 90 μs.

Figure 4:
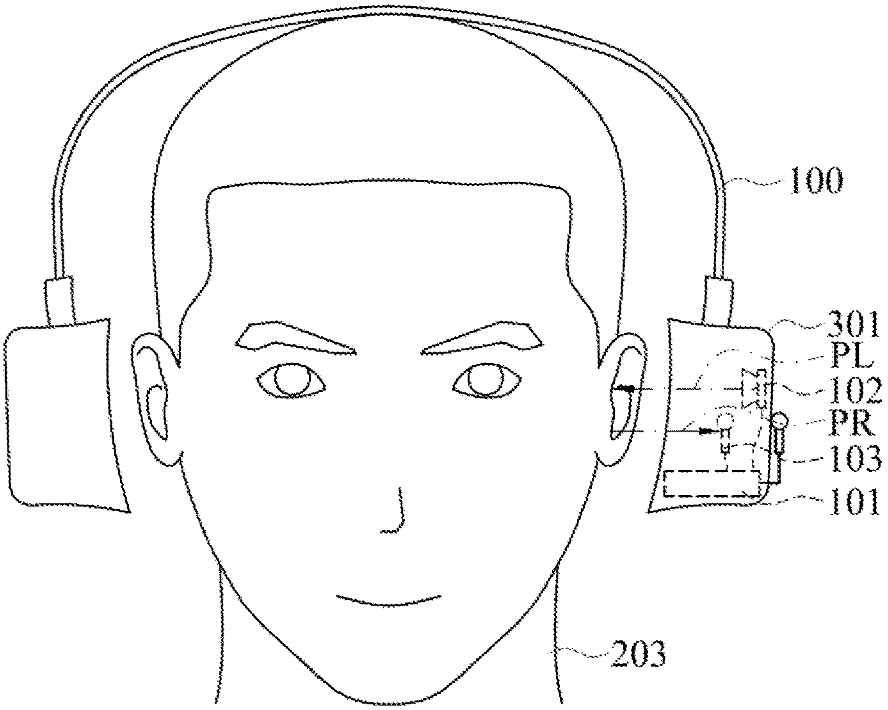
FIG. 4 is a schematic operation diagram of the headphone drawn according to an embodiment of the present invention.
Figure 9:
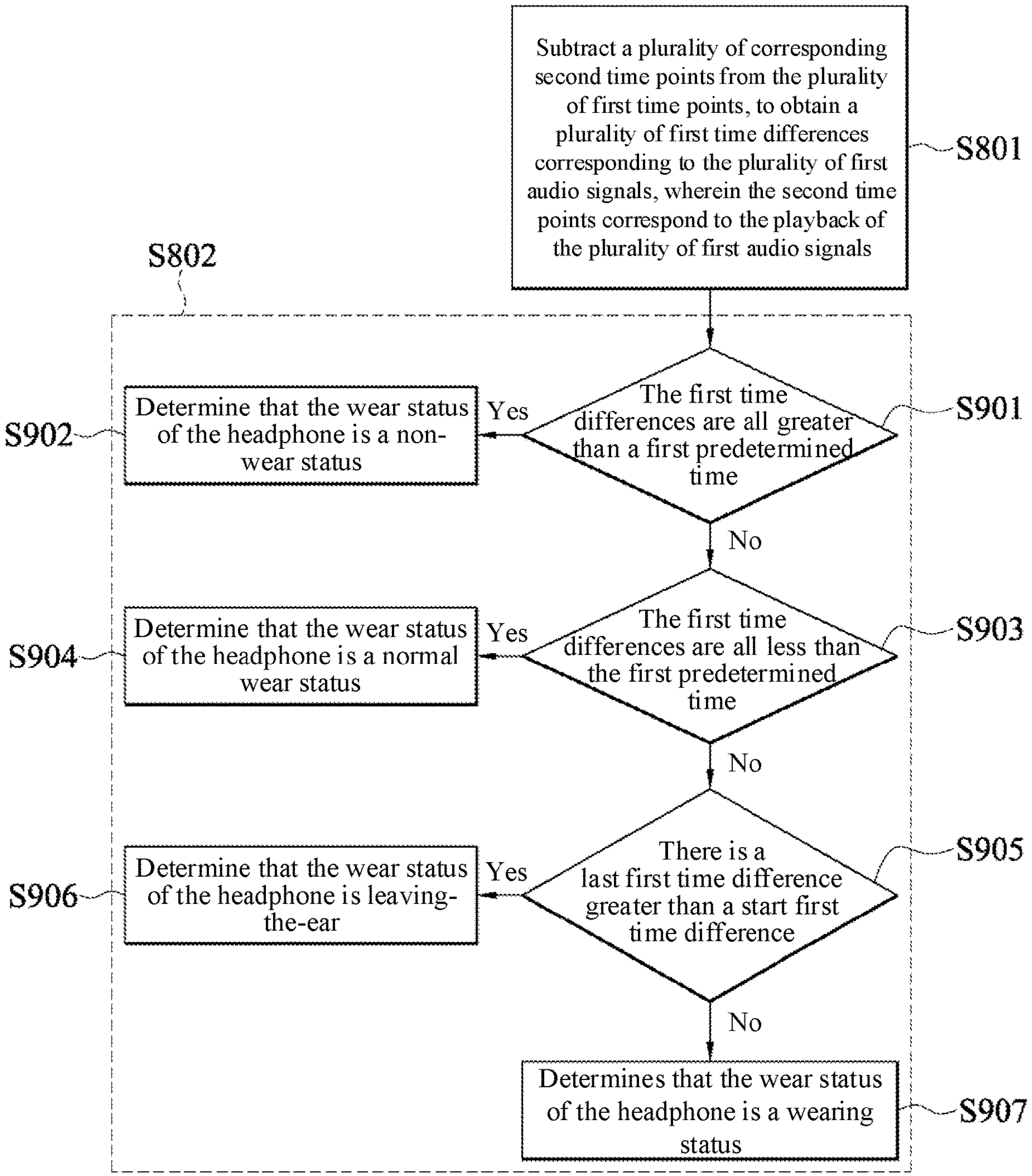
FIG. 9 is a flowchart of the headphone status detection method drawn according to an embodiment of the present invention.

FIG. 4 is a schematic operation diagram of the headphone drawn according to an embodiment of the present invention. FIG. 9 is a flowchart of the headphone status detection method drawn according to an embodiment of the present invention. In an embodiment, codes and parameters related to the codes are as recorded in Table (1), the first predetermined interval is 0.1 seconds, and the second predetermined interval is 0.1 seconds. Referring to FIG. 4 and FIG. 9 together, after performing steps S701, S702, and S801, the signal processor 101 further performs step S901. In step S901, the signal processor 101 determines whether the first time differences are all greater than the first predetermined time that is preset. If yes, it indicates that the headphone 100 continuously maintains a fixed distance or more from the object 203. Therefore, in step S902, the signal processor 101 determines that the headphone 100 is in a non-wear status.

In step S901, if the signal processor 101 determines that the first time differences are not all greater than the first predetermined time, go to step S903. In step S903, the signal processor 101 determines whether the first time differences are all less than the first predetermined time. If yes, it indicates that the headphone 100 continuously maintains a fixed distance or less from the object 203. Therefore, in step S904, in response to the difference between the first time differences being less than an error value (that is, the headphone 100 stably maintains a preset distance from the object 203), the signal processor 101 determines that the wear status of the headphone 100 is a normal wear status.

In step S903, if the signal processor 101 determines that the first time differences are not all less than the first predetermined time, it indicates that a distance between the headphone 100 and the object 203 is in change. Therefore, in step S905, a change status of the distance between the headphone 100 and the object 203 is further determined. If corresponding to the playback sequence, among the first time differences, there is a start first time difference and a last first time difference later in sequence so that the last first time difference is greater than the start first time difference, it indicates that the headphone 100 is moving away from the object 203. Therefore, the signal processor determines in step S906 that the wear status of the headphone is leaving-the-ear.

On the contrary, if there is no start first time difference and last first time difference later in sequence so that the last first time difference is greater than the start first time difference, it indicates that the headphone 100 is coming close to the object 203. Therefore, the signal processor determines in step S907 that the wear status of the headphone is a wearing status.

In some embodiments, after determining that the first time differences are not all less than the first predetermined time, the signal processor 101 further determines the change status of the distance between the headphone 100 and the object 203. If corresponding to the playback sequence, among the first time differences, there is a start first time difference and a last first time difference later in sequence so that the last first time difference is less than the start first time difference, it indicates that the headphone 100 is coming close to the object 203. Therefore, the signal processor determines that the wear status of the headphone is a wearing status.

On the contrary, if there is no start first time difference and last first time difference later in sequence so that the last first time difference is less than the start first time difference, it indicates that the headphone 100 is moving away from the object 203. Therefore, the signal processor determines that the wear status of the headphone is leaving-the-ear.

Figure 5:
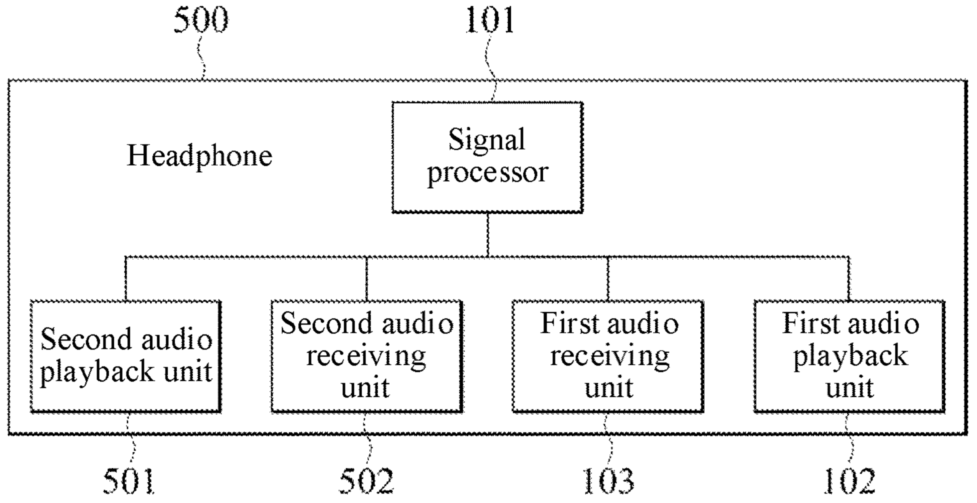
FIG. 5 is a system block diagram of a headphone drawn according to an embodiment of the present invention.
Figure 6:
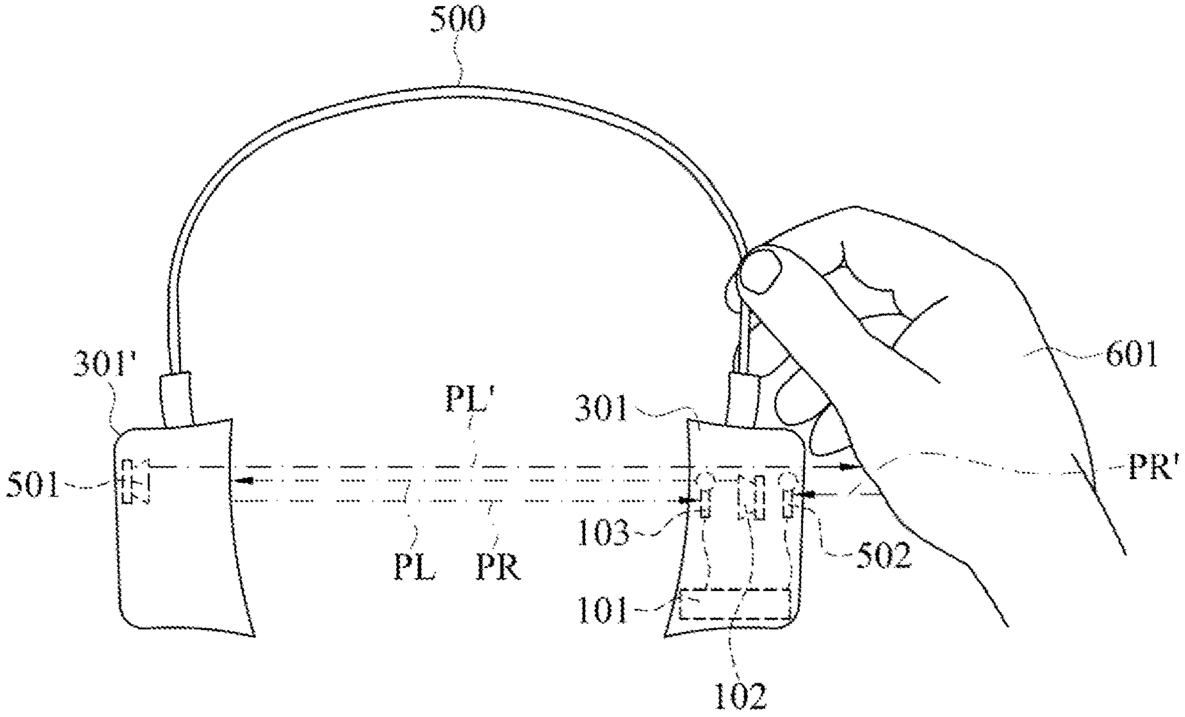
FIG. 6 is a schematic operation diagram of the headphone drawn according to an embodiment of the present invention.

FIG. 5 is a system block diagram of a headphone drawn according to an embodiment of the present invention. FIG. 6 is a schematic operation diagram of the headphone drawn according to an embodiment of the present invention. Referring to FIG. 5 and FIG. 6 together, the headphone 500 of FIG. 5 further includes a second audio playback unit 501 and a second audio receiving unit 502. The second audio playback unit 501 is an existing speaker of the headphone. The second audio receiving unit 502 is an existing feed-forward microphone of an ANC system of the headphone. The second audio playback unit 501 is disposed in a headphone shell 301'. In some embodiments, the first audio playback unit 102 and the first audio receiving unit 103 are located on one side of the headphone, and the second audio playback unit 501 and the second audio receiving unit 502 are located on the other side of the headphone. For example, the first audio playback unit 102 and the first audio receiving unit 103 are located in the headphone shell 301 corresponding to the right ear, and the second audio playback unit 501 and the second audio receiving unit 502 are located in the headphone shell 301' corresponding to the left ear.

Generally, similar to the first audio playback unit 102, the second audio playback unit 501 plays a headphone audio signal. The headphone audio signal may be generated by an audio source during the audio playback of various devices. The second audio receiving unit 502 is disposed opposite to the first audio playback unit 102, and the second audio receiving unit 502 samples an acoustic signal of the environment.

The signal processor 101 transmits code messages to the second audio playback unit 501 according to the codes 1A, 1B . . . and 10F. The second audio playback unit 501 injects a corresponding audio signal into the headphone audio signal according to the received code messages. For example, when the signal processor 101 transmits code messages corresponding to the code 2A to the second audio playback unit 501, the second audio playback unit 501 injects an audio signal of 45 kHz into the headphone audio signal after receiving the code messages corresponding to the code 2A.

Figure 10:
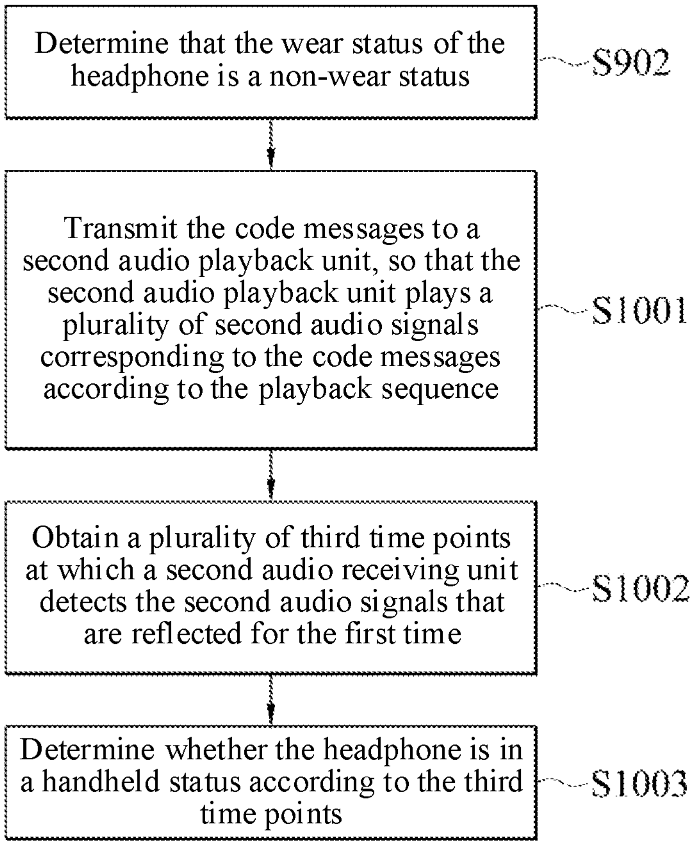
FIG. 10 is a flowchart of the headphone status detection method drawn according to an embodiment of the present invention.

FIG. 10 is a flowchart of the headphone status detection method drawn according to an embodiment of the present invention. Refer to FIG. 5, FIG. 6, and FIG. 10 together.

In step S902, the signal processor 101 determines that the headphone 500 is in a non-wear status. In this case, the status of the headphone 500 is shown in FIG. 6, and an audio signal (for example, the audio signal of 45 kHz) transmitted by the second audio playback unit 501 propagates via a path PL'. Because the headphone 500 is in a non-wear status, the audio signal transmitted by the second audio playback unit 501 is reflected via a path PR' after encountering an object 601. When sampling an acoustic signal of the environment, the second audio receiving unit 502 transmits the sampled acoustic signal to the signal processor 101. The signal processor 101 detects reflected audio signal in the acoustic signal of the environment through the second audio receiving unit 502, and obtains a time point at which the second audio receiving unit 502 receives the reflected audio signal.

In step S1001, the signal processor 101 transmits the code messages to the second audio playback unit 501 according to a playback sequence of 1A, 1B . . . and 1F at a first predetermined interval. In this embodiment, the first predetermined interval is 0.1 seconds. The second audio playback unit 501 injects a corresponding audio signal into the headphone audio signal according to the received code messages, to play a plurality of second audio signals corresponding to the code messages. After a second predetermined interval, the signal processor 101 transmits the code messages to the second audio playback unit 501 according to a playback sequence of 2A, 2B . . . and 2F at the first predetermined interval. In this embodiment, the second predetermined interval is 0.1 seconds. The signal processor 101 repeats the above process until the code messages corresponding to all codes are transmitted to the second audio playback unit 501.

In step S1002, the second audio receiving unit 502 transmits the sampled acoustic signal to the signal processor 101. The signal processor 101 detects a reflected audio signal in the acoustic signal of the environment through the second audio receiving unit 502, and obtains a plurality of third time points at which the second audio receiving unit 502 receives the second audio signals that are reflected for the first time.

In step S1003, the signal processor 101 further determines whether the headphone 500 is in a handheld status according to the third time points.

In some embodiments, in response to time intervals of the third time points being the same, the signal processor 101 determines that the headphone 500 is in a handheld status.

Figure 11:
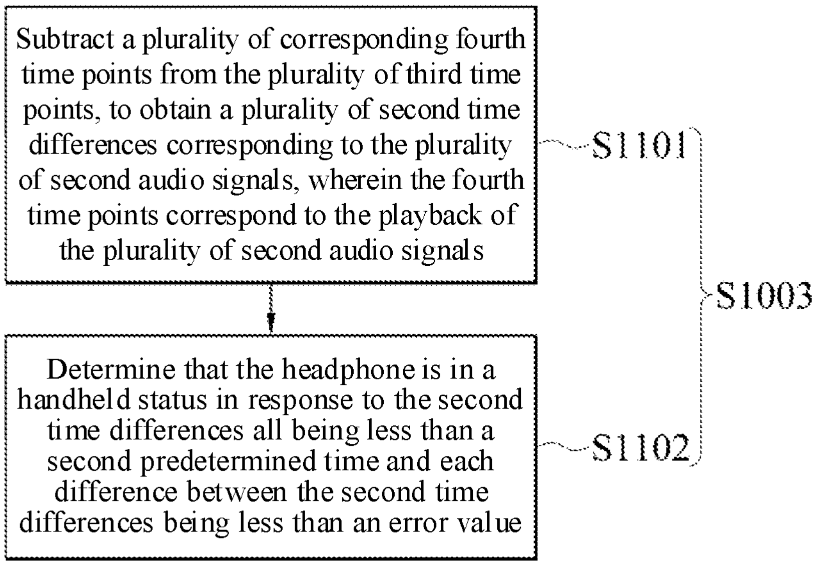
FIG. 11 is a flowchart of the headphone status detection method drawn according to an embodiment of the present invention.

FIG. 11 is a flowchart of the headphone status detection method drawn according to an embodiment of the present invention. Referring to FIG. 11, in some embodiments, the foregoing step S1003 further includes steps S1101 and S1102. In step S1101, when transmitting code messages corresponding to the codes 1A, 1B . . . and 10F, the signal processor 101 stores a plurality of fourth time points at which the code messages are transmitted, and then respectively subtracts the fourth time points corresponding to the same codes from the third time points, to obtain a plurality of second time differences.

In step S1102, the signal processor 101 further determines whether the headphone 500 is in a handheld status according to the second time differences.

If the first time differences are all less than a second predetermined time that is preset and the second time differences are approximately the same as each other, it indicates that the headphone 500 stably maintains a preset distance from the object 601, and it can be determined that the headphone 500 is in a handheld status. Therefore, in response to the second time differences all being less than the second predetermined time that is preset and each difference between the second time differences being less than an error value, the signal processor 101 determines that the headphone 500 is in a handheld status. In this embodiment, the second predetermined time is 900 μs. It should be noted that, the second predetermined time is set according to actual positions at which the second audio playback unit 501 and the second audio receiving unit 502 are disposed in the headphone 500, and the present invention is not limited to this.

In this specification, a "computer-readable medium" is used to refer to a non-volatile, non-transitory medium, such as a read only memory (ROM), a flash memory, a floppy disk, a hard disk, a compact disk (CD), a digital versatile disc (DVD), a flash drive, a database accessible by a network, or any other storage medium with the same functions known to those with ordinary knowledge in the technical field of the present invention. These and other various forms of computer-readable media may involve carrying one or more sequences of one or more instructions to the signal processor 101 for execution. These instructions embodied in the media are usually referred to as "computer program code" or "computer program product". The "computer program code" or "computer program product" may be a file that can be transmitted over the network, or may be stored in a non-transitory computer-readable storage medium. When these instructions are executed, the signal processor 101 can perform the steps or functions described in the present invention.

Based on the above, the embodiments of the present invention provide a headphone, a headphone status detection method, a computer-readable recording medium with a stored program, and a non-transitory computer program product. The first audio playback unit receives a plurality of code messages transmitted by the signal processor, and plays a plurality of first audio signals corresponding to the plurality of code messages according to a playback sequence. Any two audio signals with a same frequency among the first audio signals are spaced by at least a first quantity of audio signals with frequencies different from each other. The signal processor obtains a plurality of first time points at which the first audio receiving unit receives the plurality of first audio signals that are reflected for the first time. The signal processor further determines a wear status of the headphone according to the plurality of first time points. Accordingly, in the headphone, the headphone status detection method, the computer-readable recording medium with a stored program, and the non-transitory computer program product according to the embodiments of the present invention, an existing speaker in a headphone can be used as the first audio playback unit and a microphone with an ANC system can be used as the first audio receiving unit. Therefore, no additional components are required, and the cost or complexity of the headphone is not increased.

Moreover, in an embodiment of the present invention, by corresponding to different time codes, audio signals with a same frequency are played via the first audio playback unit after a sufficiently long interval. Therefore, the signal processor is not likely to be confused with the audio signals even though the frequencies of the audio signals are the same.

What is claimed is:

1. A headphone, comprising:

a signal processor, configured to sequentially transmit a plurality of code messages with different frequencies in a period, wherein, in the period, any two code messages that are successively transmitted among the plurality of code messages correspond to different frequencies;

a first audio playback unit, receiving the plurality of code messages and playing a plurality of first audio signals whose frequencies corresponding to the plurality of code messages according to a playback sequence; and a first audio receiving unit, wherein the signal processor obtains a plurality of first time points at which the first audio receiving unit receives the plurality of first audio signals that are reflected for the first time; and the signal processor determines a wear status of the headphone according to the plurality of first time points.

2. The headphone according to claim 1, wherein the signal processor is further configured to subtract a plurality of corresponding second time points from the plurality of first time points, to obtain a plurality of first time differences corresponding to the plurality of first audio signals, wherein the second time points correspond to the playback of the plurality of first audio signals; and the signal processor further determines the wear status of the headphone according to changes of the plurality of first time differences.

3. The headphone according to claim 2, wherein in response to the plurality of first time differences all being less than a first predetermined time, the signal processor determines that the wear status of the headphone is a normal wear status.

4. The headphone according to claim 2, wherein in response to any one of the plurality of first time differences being less than a first predetermined time and a last first time difference among the plurality of first time differences being less than a start first time difference among the plurality of first time differences, the signal processor determines that the wear status of the headphone is a wearing status, wherein the start first time difference is before the last first time difference according to the playback sequence.

5. The headphone according to claim 2, wherein in response to any one of the plurality of first time differences being less than a first predetermined time and a last first time difference among the plurality of first time differences being greater than a start first time difference among the plurality of first time differences, the signal processor determines that the wear status of the headphone is leaving-the-ear, wherein the start first time difference is before the last first time difference according to the playback sequence.

6. The headphone according to claim 2, wherein in response to the plurality of first time differences all being greater than a first predetermined time, the signal processor determines that the wear status of the headphone is a non-wear status.

7. The headphone according to claim 6, wherein the headphone further comprises a second audio playback unit and a second audio receiving unit, the second audio playback unit receives the plurality of code messages transmitted by the signal processor, and the second audio playback unit plays a plurality of second audio signals corresponding to the plurality of code messages according to the playback sequence; after the signal processor determines that the wear status of the headphone is the non-wear status, the signal processor obtains a plurality of third time points at which the second audio receiving unit receives the plurality of second audio signals that are reflected for the first time; and the signal processor determines whether the headphone is in a handheld status according to the plurality of third time points.

8. The headphone according to claim 7, wherein the signal processor is further configured to subtract a plurality of corresponding fourth time points from the plurality of third time points, to obtain a plurality of second time differences corresponding to the plurality of second audio signals, wherein the fourth time points correspond to the playback of the plurality of second audio signals; and in response to the plurality of second time differences all being less than a second predetermined time, the signal processor determines that the headphone is in the handheld status.

9. The headphone according to claim 1, wherein the signal processor is further configured to sequentially transmit, according to a plurality of time codes, the plurality of code messages corresponding to each of the plurality of time codes, and the code messages corresponding to a same time code respectively correspond to different frequencies.

10. A headphone status detection method, performed by a signal processor of a headphone, comprising the following steps:

sequentially transmitting a plurality of code messages with different frequencies to a first audio playback unit in a period, so that the first audio playback unit plays a plurality of first audio signals whose frequencies corresponding to the plurality of code messages according to a playback sequence, wherein, in the period, any two code messages that are successively transmitted among the plurality of code messages correspond to different frequencies;

obtaining a plurality of first time points at which a first audio receiving unit receives the plurality of first audio signals that are reflected for the first time; and determining a wear status of the headphone according to the plurality of first time points.

11. The headphone status detection method according to claim 10, wherein the step of determining the wear status of the headphone according to the plurality of first time points comprises:

subtracting a plurality of corresponding second time points from the plurality of first time points, to obtain a plurality of first time differences corresponding to the plurality of first audio signals, wherein the second time points correspond to the playback of the plurality of first audio signals; and further determining, by the signal processor, the wear status of the headphone according to changes of the plurality of first time differences.

12. The headphone status detection method according to claim 11, wherein the step of further determining, by the signal processor, the wear status of the headphone according to changes of the plurality of first time differences comprises:

determining that the wear status of the headphone is a normal wear status in response to the plurality of first time differences all being less than a first predetermined time.

13. The headphone status detection method according to claim 11, wherein the step of further determining, by the signal processor, the wear status of the headphone according to changes of the plurality of first time differences comprises:

determining that the wear status of the headphone is a wearing status in response to any one of the plurality of first time differences being less than a first predetermined time and a last first time difference among the plurality of first time differences being less than a start first time difference among the plurality of first time differences, wherein the start first time difference is before the last first time difference according to the playback sequence.

14. The headphone status detection method according to claim 11, wherein the step of further determining, by the signal processor, the wear status of the headphone according to changes of the plurality of first time differences comprises:

determining that the wear status of the headphone is leaving-the-ear in response to any one of the plurality of first time differences being less than a first predetermined time and a last first time difference among the plurality of first time differences being greater than a start first time difference among the plurality of first time differences, wherein the start first time difference is before the last first time difference according to the playback sequence.

15. The headphone status detection method according to claim 11, wherein the step of further determining, by the signal processor, the wear status of the headphone according to changes of the plurality of first time differences comprises:

determining that the wear status of the headphone is a non-wear status in response to the plurality of first time differences all being greater than a first predetermined time.

16. The headphone status detection method according to claim 15, further comprising:

transmitting the plurality of code messages to a second audio playback unit, so that the second audio playback unit plays a plurality of second audio signals corresponding to the plurality of code messages according to the playback sequence;

after determining that the wear status of the headphone is the non-wear status, obtaining a plurality of third time points at which a second audio receiving unit receives the plurality of second audio signals that are reflected for the first time; and determining whether the headphone is in a handheld status according to the plurality of third time points.

17. The headphone status detection method according to claim 16, wherein the step of determining whether the headphone is in the handheld status according to the plurality of third time points comprises:

subtracting a plurality of corresponding fourth time points from the plurality of third time points, to obtain a plurality of second time differences corresponding to the plurality of second audio signals, wherein the fourth time points correspond to the playback of the plurality of second audio signals; and determining that the headphone is in the handheld status in response to the plurality of second time differences all being less than a second predetermined time and each difference between the plurality of second time differences being less than an error value.

18. The headphone status detection method according to claim 10, wherein the step of sequentially transmitting the plurality of code messages comprises:

sequentially transmitting, according to a plurality of time codes, the plurality of code messages corresponding to each of the plurality of time codes, wherein the code messages corresponding to a same time code respectively correspond to different frequencies.

* * * * *